(12) United States Patent
Guerra Sánchez et al.

(10) Patent No.: US 12,434,428 B2
(45) Date of Patent: Oct. 7, 2025

(54) 3D PRINTING DEVICE, 3D PRINTING METHOD AND 3D TUBULAR OBJECTS OBTAINED BY SAID METHOD

(71) Applicant: FUNDACIÓ EURECAT, Barcelona (ES)

(72) Inventors: Antonio Jesús Guerra Sánchez, Salt Girona (ES); Arcadi Castanyer Caballe, Anglès Girona (ES); Josep Maria Serres Serres, Tortosa Tarragona (ES); Victor Llamas Martinez, Zamora Zamora (ES); Francisco Javier Planta Torralba, El Masnou Barcelona (ES); Miquel Domingo Espin, Barcelona Barcelona (ES); Adrián Mora Pedregosa, Barcelona Barcelona (ES)

(73) Assignee: FUNDACIÓ EURECAT, Barcelona (ES)

( * ) Notice: Subject to any disclaimer, the term of this patent is extended or adjusted under 35 U.S.C. 154(b) by 0 days.

(21) Appl. No.: 18/034,529

(22) PCT Filed: Oct. 29, 2021

(86) PCT No.: PCT/EP2021/080095
§ 371 (c)(1),
(2) Date: Apr. 28, 2023

(87) PCT Pub. No.: WO2022/090451
PCT Pub. Date: May 5, 2022

(65) Prior Publication Data
US 2024/0326324 A1    Oct. 3, 2024

(30) Foreign Application Priority Data
Oct. 30, 2020    (EP) ................................... 20382945

(51) Int. Cl.
*B29C 33/56*    (2006.01)
*A61F 2/90*    (2013.01)
(Continued)

(52) U.S. Cl.
CPC .............. *B29C 64/124* (2017.08); *A61F 2/90* (2013.01); *A61L 31/022* (2013.01); *A61L 31/10* (2013.01);
(Continued)

(58) Field of Classification Search
CPC . B29C 2033/0005; B29C 33/56; B29C 33/58; B29C 33/60; B29C 33/68;
(Continued)

(56) References Cited

U.S. PATENT DOCUMENTS

2014/0114431 A1    4/2014    Yamagata
2016/0311158 A1    10/2016    DeSimone et al.
(Continued)

FOREIGN PATENT DOCUMENTS

JP    H07304104 A    11/1995
JP    2000043150 A    2/2000

OTHER PUBLICATIONS

International Search Report from corresponding International Application No. PCT/EP2021/080095 mailed on Dec. 21, 2021, 3 pages.

*Primary Examiner* — Leo B Tentoni
(74) *Attorney, Agent, or Firm* — Tucker Ellis LLP

(57) ABSTRACT

3D printing device and 3D printing method. The device comprising:
  a build platform having an external surface;
  means for providing a polymerizable fluid resin on said surface;
  a radiation source, to emit a radiation beam to said surface;
  beam positioning means, to variably position an impinging point of said beam; and
(Continued)

means for controlling said source and said positioning means to manufacture a 3D tubular object according to a model;

wherein the build platform comprises a stem forming a tubular shaped surface around a longitudinal axis, so that said external surface of said build platform is comprised in said tubular shaped surface, and said positioning means is configured to variably position said impinging point of said beam on different points of said fluid resin provided on said tubular shaped surface.

14 Claims, 7 Drawing Sheets

(51) Int. Cl.
| | | |
|---|---|---|
| A61L 31/02 | (2006.01) | |
| A61L 31/10 | (2006.01) | |
| B29C 33/58 | (2006.01) | |
| B29C 33/60 | (2006.01) | |
| B29C 33/68 | (2006.01) | |
| B29C 64/124 | (2017.01) | |
| B29C 64/232 | (2017.01) | |
| B29C 64/236 | (2017.01) | |
| B29C 64/241 | (2017.01) | |
| B29C 64/245 | (2017.01) | |
| B29C 64/255 | (2017.01) | |
| B29C 64/264 | (2017.01) | |
| B29C 64/268 | (2017.01) | |
| B29C 64/273 | (2017.01) | |
| B29C 64/393 | (2017.01) | |
| B33Y 10/00 | (2015.01) | |
| B33Y 30/00 | (2015.01) | |
| B33Y 50/02 | (2015.01) | |
| B33Y 80/00 | (2015.01) | |
| B29C 33/00 | (2006.01) | |
| B29K 105/00 | (2006.01) | |
| B29L 23/00 | (2006.01) | |
| B29L 31/00 | (2006.01) | |

(52) U.S. Cl.
CPC .......... *B29C 64/245* (2017.08); *B29C 64/255* (2017.08); *B29C 64/268* (2017.08); *B29C 64/393* (2017.08); *B33Y 10/00* (2014.12); *B33Y 30/00* (2014.12); *B33Y 50/02* (2014.12); *B33Y 80/00* (2014.12); *A61F 2240/002* (2013.01); *A61F 2250/0018* (2013.01); *B29C 2033/0005* (2013.01); *B29K 2105/0067* (2013.01); *B29K 2877/00* (2013.01); *B29K 2905/12* (2013.01); *B29K 2995/0056* (2013.01); *B29L 2023/00* (2013.01); *B29L 2031/7534* (2013.01)

(58) Field of Classification Search
CPC ... B29C 64/232; B29C 64/236; B29C 64/241; B29C 64/245; B29C 64/264; B29C 64/268; B29C 64/273; B29C 64/386; B29C 64/393; B29K 2105/0067; B33Y 30/00; B33Y 50/00; B33Y 50/02
USPC ............. 425/135, 141, 145, 174.4, 447, 470
See application file for complete search history.

(56) References Cited

U.S. PATENT DOCUMENTS

| | | | |
|---|---|---|---|
| 2017/0246804 A1 | 8/2017 | El-Siblani et al. | |
| 2018/0296343 A1 | 10/2018 | Wei | |
| 2019/0311822 A1 | 10/2019 | Perigo et al. | |
| 2020/0384685 A1* | 12/2020 | Crawford | B29C 64/241 |
| 2021/0094228 A1* | 4/2021 | Cambron | B29C 64/241 |

* cited by examiner

ABSTRACT

3D PRINTING DEVICE, 3D PRINTING METHOD AND 3D TUBULAR OBJECTS OBTAINED BY SAID METHOD

RELATED APPLICATION DATA

This application is a national phase application of International Application No. PCT/EP2021/080095 filed Oct. 29, 2021, which claims priority to European Application No. 20382945.2 filed Oct. 30, 2020. The entireties of the aforementioned applications are incorporated herein by reference.

DESCRIPTION

Field of The Invention

The invention refers to the field of manufacturing objects by means of additive manufacturing processes, generally known as 3D printing.

More specifically, the invention refers to a 3D printing device for manufacturing at least one tubular 3D object according to a printing model. Said 3D printing device comprising:
- a build platform having an external surface;
- resin providing means, configured to provide, on said external surface of said build platform, a fluid resin which is polymerizable by electromagnetic radiation;
- an electromagnetic radiation source, configured to emit, from a source output to said external surface of said build platform, a beam of an electromagnetic radiation suitable for polymerizing said fluid resin;
- beam positioning means, configured to variably position an impinging point of said beam on said fluid resin provided on said external surface; and
- control means, configured to control said beam positioning means and said electromagnetic radiation source according to said printing model to manufacture said tubular 3D object.

The invention also refers to a corresponding 3D printing method, as well as tubular 3D objects obtained by said method.

State of the Art

In the field of 3D printing, solutions are known that allow the manufacture of objects with high resolutions. In particular, stereolithography (SL) techniques are known, which allow printing 3D objects with high resolution as such techniques are based on the successive creation of micrometric layers, generally 10 microns or more in thickness, of a resin polymerized by the incidence of a beam of electromagnetic radiation, generally ultraviolet light. The incident light usually comes from a laser or from a homogeneous light source that is masked according to the points to be polymerized in each layer of resin. In both cases, it is possible to obtain high precision in the points to be polymerized, and thus this technique is capable of printing 3D objects with high resolution. Stereolithography requires the use of a tray that is filled with the resin to be polymerized, in which successive horizontal layers of material are created from a flat substrate that serves as a build platform. During the creation of each layer, the device remains stationary, without movement of the build platform. Generally, after the creation of each layer, the 3D object in construction must be moved and/or new resin must be added in order to create the next layer. This results in a slow printing method due to the layering manufacture. In general, the time needed to create a 3D object increases with the resolution, i.e. the smaller the details to be created, the finer the successive layers must be and therefore, the more layers are needed. Furthermore, stereolithography can also involve a high expenditure of resin since, on the one hand, the object to be printed is immersed in the printing tray and it is necessary to cover it up with sufficient resin and, on the other hand, it is necessary to create support structures for the cantilevered parts of the object, which must subsequently be removed to achieve the completed object.

Other types of techniques provide a higher manufacturing speed and economy of materials, although they do not achieve the same precision as stereolithography. This is the case, for example, of FDM (Fusion Deposition Modelling) techniques, which are based on point to point deposition of molten thermoplastic material. In known FDM techniques it is not possible to achieve high resolution detail below 200 microns. The main reason is that the nozzle that delivers the molten material cannot be too small, since the material would not flow through it. Another drawback of FDM is that the manufactured object has rugosities due to the point to point deposition. In addition, the speed at which the melt material flows from the nozzle cannot usually be controlled with high precision. Therefore, FDM techniques are not suitable for producing high-resolution objects with details having very small sizes.

A particular case of 3D printing refers to the creation of tubular objects. In the present document, the term "tubular object" generally refers to any object having an empty internal area delimited by a tubular surface and polymerized material extending over the whole or part of said tubular surface. Unless otherwise indicated, the term "tubular surface" generally refers to a surface extending around a longitudinal axis and shall not necessarily be limited to a regular shape, such as cylindrical shape for instance.

FDM techniques can be used for 3D printing of tubular objects. However, these techniques have the disadvantage that the tubular surface of the empty area of the printed tubular object generally has significant irregularities between the points where the molten material is deposited by the nozzle. In order to solve this problem, a particular FMD 3D printing method is proposed in GUERRA SÁNCHEZ, Antonio. *Contribution to bioabsorbable stent manufacture with additive manufacturing technologies* (Ph.D. thesis Universitat de Girona, 2019. Available at: http://hdl.handle.net/10803/667867). In this particular method, the material is deposited by the nozzle over the surface of a cylindrical core. Since the molten material is deposited by the nozzle on a smooth cylindrical surface of the core, a much more regular tubular surface of the empty area of the printed tubular object can be obtained. However, in addition to the inherent drawbacks of FDM techniques discussed above, a problem which arises with this particular method is that the combination of a point to point deposition and a relative rotation between the nozzle and the cylindrical core limits the printing speed.

JP2000043150A discloses a 3D printer intended to manufacture a composite product comprising a metallic shaft and a gearwheel. Only the gearwheel is made of polymerized resin by 3D printing. The shaft is rotatably mounted inside a liquid resin tank and a radiation beam polymerizes the resin on the shaft to form the gearwheel. The final product is a composite product in which the gearwheel formed by 3D printing is integral with the metallic shaft.

US2019311822A1 discloses a similar method, in which the composite product is an electrical conductor rod with a condenser. The rod is partially submerged in a liquid resin tank of resin and is rotated with a controlled speed to adjust the thickness of a resin layer formed on the rod. A radiation beam polymerizes the resin layer on the rod to form the condenser. The final product is a composite product in which the condenser formed by 3D printing is integral with the rod.

Thus, a 3D printing solution is needed for printing high-resolution tubular objects, and which solves the problems of slowness, cost and additional steps described above.

SUMMARY OF THE INVENTION

The purpose of the invention is to provide a 3D printing device of the type stated at the beginning, being able to avoid the problems that have been identified above.

This purpose is achieved by means of a 3D printing device of the type indicated at the beginning, characterized in that said build platform comprises a stem having a longitudinal axis, said stem forming a tubular shaped surface around said longitudinal axis, so that said external surface of said build platform is comprised in said tubular shaped surface, and wherein said beam positioning means is configured for variably positioning said impinging point of beam on different points of at least one part of said fluid resin provided on said tubular shaped surface.

The tubular shaped surface is formed in at least a section of the stem, but not necessarily along all the stem. The stem itself is not necessarily formed as a single piece.

In this way, the flat support of traditional stereolithography techniques is not used, and instead, a stem with a tubular-shaped surface is used as a build platform: the resin is provided covering the tubular shaped surface of said stem and is polymerized directly thereon. The thickness of the fluid resin on the support corresponds to the thickness of the polymerized resin layer, except for the possible contraction or expansion effects during polymerization. The successive layers are thus created concentrically around the stem. In this way, the number of layers is significantly reduced compared to the manufacture of horizontal layers arranged on top of each other. In some cases, a single layer may be sufficient to create the 3D tubular object.

This reduction in the number of layers and their arrangement has several advantages. Firstly, the manufacturing time is considerably reduced. In addition, the strength of the resulting object is improved because it has less layer junctions, and because the layers they are arranged concentrically. On the other hand, compared to the stereolithography methods known in the art, it is easier to manufacture objects having cantilevered parts because there is no need for the aforementioned support structures that must be subsequently removed. Additionally, it is possible to encapsulate therapeutic agents between layers, as these layers are arranged concentrically. Finally, it is possible to manufacture 3D tubular objects with concentric layers made from different resins, which can be particularly advantageous in the creation of tubular objects that require, for example, different mechanical characteristics between the internal and external layers. All this contributes to the fact that the solution proposed herein is particularly advantageous for the manufacture of 3D tubular objects that require a tubular empty area.

Preferably, said beam positioning means is configured to variably position said impinging point of said beam on said fluid resin by at least:
- a circumferential positioning in a circumferential direction around said longitudinal axis; and
- a longitudinal positioning along a longitudinal direction defined by said longitudinal axis.

It is therefore possible to use a 3D printing model in which the points of each layer are defined using just two coordinates, one corresponding to the relative circumferential position between the beam and the stem, and one for the relative longitudinal position. This type of coordinates differs from the Cartesian coordinates used in conventional stereolithography. In the case of the invention it is not necessary to create layers in the XY plane and to deposit each layer following the Z axis. Instead, in the invention each layer already results in a three-dimensional body, although defined by only two coordinates but according to a tubular geometry. This type of positioning simplifies the 3D modeling and reduces the computational cost required in the printing device, since a decomposition of the Cartesian coordinates to the relative positions between the support and the equivalent beam is not necessary. In particular, the type of positioning described relates to cylindrical coordinates and is particularly advantageous when the support on which is to be printed is tubular, and especially advantageous if it is cylindrical.

Preferably, said beam positioning means is further configured to variably position said impinging point of said beam on said fluid resin by a distance positioning between said source output and said tubular shaped surface of said stem, thereby defining a beam length. This distance positioning has two main advantages: firstly, it allows to determine a suitable beam length so that the focal point coincides with the point of incidence on the resin. Secondly, it allows the beam length to be adapted to the geometry of the stem, so that it is not necessary for the stem to be cylindrical, and thus, other less regular shapes can be envisaged.

Preferably, said electromagnetic radiation comprises at least one of the list consisting of: infrared radiation, visible light, and ultraviolet radiation. Ultraviolet radiation, UV, has been commonly used in the field of stereolithography, however, the device of the invention is not limited to a particular UV-polymerizable resin. Different fluid resins can also be envisaged for specific applications, for example, biocompatible resins with photoinitiators sensitive to visible or infrared wavelengths, IR.

Preferably, said tubular shaped surface of said stem has symmetry of revolution regarding said longitudinal axis. In the case that the stem is a body of revolution, for each longitudinal point, the distance from the longitudinal axis to the tubular shaped surface of the stem is the same for any angle, which facilitates positioning of the beam and reduces the computational cost required to determine this positioning according to the printing model.

Said tubular shaped surface of said stem preferably has conical, frustoconical or cylindrical shape, thus enhancing the advantages described above, particularly in the case of a cylindrical shape. Indeed, in the latter case, the distance between the longitudinal axis and the tubular shaped surface of the stem is the same for any angle and along the entire length of the tubular shaped surface of the stem.

In the art, the term diffuse surface refers to one in which the incident electromagnetic radiation is reflected at a multitude of angles, instead of a single angle of reflection. This phenomenon occurs usually due to the presence of irregularities on the surface, said irregularities of a size comparable to the wavelength of the incident electromagnetic radiation. On the contrary, specular surfaces are those where the phenomenon of specular reflection is more noticeable, which occurs when the reflectivity is close to zero at all angles except one. These are generally smooth polished materials. Consequently, a diffuse surface is substantially free of specular reflection.

Preferably, said tubular shaped surface of said stem is a diffuse surface for the wavelengths of said electromagnetic radiation. Therefore, the portion of the energy of the electromagnetic radiation that is reflected is distributed at various angles and is not concentrated in a single direction as with an specular reflection, which otherwise could cause a polymerization of the fluid resin that is in the path of that specular reflection. As a result, the accuracy of the manufactured object is increased, because less parasitic polymerization occurs at neighboring points which are impacted by the reflected beam.

Preferably, said tubular shaped surface of said stem does not reflect said electromagnetic radiation, i.e. the incident beam is substantially not reflected by the tubular shaped surface, and the energy is absorbed thereto, at least for the wavelengths corresponding to the electromagnetic radiation, thus minimizing the effect of parasitic polymerization described above.

Preferably, said tubular shaped surface of said stem is opaque to said electromagnetic radiation, so that the incident beam is not transmitted through the stem and/or is not affected by other internal reflections, which could produce undesired polymerizations if there is fluid resin at the exit point.

Preferably, said stem comprises a rigid core wrapped in an external layer made of elastomer material, said external layer forming said tubular shaped surface of said stem. Said rigid core provides high mechanical resistance to the stem and makes it less prone to torsion. Besides, the elastomer layer facilitates the removal of the object after printing, due to its elastic capabilities. In addition, said elastomer also has a diffuse surface for the electromagnetic radiation of the beam. The rigid core is preferably made of metal and, in particular, steel, thereby maximizing the effect described above while keeping a moderate manufacturing cost for the device. The elastomer material is preferably latex or nylon, which physical and chemical characteristics are particularly advantageous for achieving the above-mentioned effects of unmold and diffuse reflection.

Preferably, said resin providing means comprises a resin tank, arranged in such a way that the stem goes through said resin tank, so that the fluid resin is supplied directly from this resin tank to the tubular shaped surface of the stem. This arrangement simplifies the device because it avoids the use of more complex means of supplying resin to the tubular shaped surface of the stem, as for example by irrigation, brushing, through a transfer roller, etc. In this way, the cost of manufacturing the device may be minimized and the control methods necessary for managing the fluid resin supply may be simplified. If necessary, as the fluid resin is polymerized, the resin tank is filled with more fluid resin.

In a preferred embodiment, the stem is arranged horizontally so that all of the tubular shaped surface is located below a resin filling level in the resin tank. Therefore, the longitudinal axis is horizontal and so it is the longitudinal direction. Preferably, the device includes means for rotating the stem around its longitudinal axis, so that, in order to print a point on a given longitudinal position, the beam hits the point in the tubular shaped surface of the stem that is highest for a given longitudinal position. Thus, the thickness of the resin to be polymerized for said point corresponds to the distance between the height of the point and the resin fill level. Therefore, the thickness of each layer can be controlled by means of the resin fill level, considering the shape of the stem, as well as possible contractions or expansions of the fluid resin when it is polymerized. Preferably, the tank is filled with additional fluid resin as said fluid resin is used up during printing. The person skilled in the art will understand that the filling level may vary, for example, it may be necessary to increase the level between successive layers of printing or, alternatively, to lower the stem. This embodiment is particularly advantageous if the stem is cylindrical, since the distance between the fill level and the highest point of the stem is the same throughout the entire length of the stem, making it easier to control the thickness of the resin layer.

In an alternative embodiment, the stem is arranged horizontally so that a part of the tubular shaped surface is located above a resin filling level in the resin tank and another part of the tubular shaped surface is located below said resin filling level. Therefore, the fluid resin is dragged by the tubular shaped surface of the stem as the stem rotates around its longitudinal axis, from the bottom of the tank up to the top of the filling level where it can be irradiated by the beam and polymerized. In this way, it is possible to obtain a thin layer that can be precisely polymerized. The expert will understand that the thickness of the layer will depend on the characteristics of the fluid resin, in particular its viscosity, as well as the tubular shaped surface of the stem, in particular its porosity or relief. Consequently, it is possible to obtain the desired layer thickness by controlling such characteristics.

In another preferred embodiment, the resin tank comprises a container arranged around the stem, so that a resin chamber is defined between the container and the tubular shaped surface of said stem, said container being made of a material which is transparent to an electromagnetic radiation. In this way, it is possible to irradiate the fluid resin from outside the container, through the transparent wall and towards the resin chamber. This has several advantages. Firstly, the thickness of the resin layer is very precisely determined by the thickness of the resin chamber. Furthermore, since the stem is wrapped by the container, it is possible to arrange the stem at the most convenient angle, even vertically. An additional advantage is that the waste of resin is minimized, as it is only necessary to provide a precise amount of fluid resin into the resin chamber.

Preferably, the 3D printing device further comprises temperature control means, configured to control the temperature of the fluid resin provided on the tubular shaped surface of the stem by the resin providing means, thus allowing the control of the fluid resin viscosity. Preferably said temperature control means comprises a Thermoelectrical cell, also known as Peltier cell, thus being able to both warm up and cool down the temperature of the fluid resin.

In a preferred embodiment, the electromagnetic radiation source comprises an electromagnetic radiation generator and an optical fiber guidance module, configured to guide said electromagnetic radiation to an optical fiber output, so that said source output is said optical fiber output. Preferably, the fiber output includes one or more lenses to concentrate the output radiation in a narrow beam.

In an alternative embodiment, the electromagnetic radiation source comprises a laser having a laser output, so that said source output is said laser output, thus taking advantage of the narrow and concentrated laser beam characteristics to impact with high precision on the desired points. The expert in the matter will understand that the guidance of the laser beam can include known elements, among other non-limiting examples, mirrors, prisms, lenses, or combinations of the above. In the context of the invention said laser output refers to the point at which the beam leaves the guidance system, if any, and is directed to the impinging point on the tubular shaped surface of the stem.

Preferably, the stem is rotatably mounted around the longitudinal axis, and wherein the beam positioning means comprises:
- a rotation control element, to control a circumferential positioning of said impinging point of said beam in a circumferential direction around said longitudinal axis by controlling a rotation of said stem around said longitudinal axis;
- a longitudinal position control element, to control a longitudinal position of said impinging point of said beam along a longitudinal direction defined by said longitudinal axis; and
- a distance control element, to control a distance between said source output and said tubular shaped surface of said stem, thereby defining a beam length.

Therefore, it is possible to position the beam by controlling the relative position of the stem and the beam. In particular, the stem is rotated around the longitudinal axis, while the beam is positioned longitudinally and in distance. Alternatively, it is possible to envisage embodiments in which the beam is positioned in rotation around the stem and the latter remains stationary. However, the rotation of the stem is a preferable option since it simplifies the design of the device and the energy consumption during its operation. The distance control allows adaptation to the shape of the stem, as well as positioning the impinging point of the beam according to its focal point.

Preferably, said rotation control element comprises a servomotor operationally connected to the stem to cause the rotation of said stem around the longitudinal axis, so that the support can be rotated by means of a technical element that can be easily integrated into the printing device.

Preferably, the longitudinal position control element comprises at least a straight longitudinal guide configured to longitudinally position the source output in a direction parallel to the longitudinal axis. As a non-limitative example, the position control element comprises one straight longitudinal guide, so that a laser is shiftable along said straight longitudinal guide.

Preferably, the distance control element comprises at least a straight transversal guide configured to transversally position the source output in a direction orthogonal to the longitudinal axis. As a non-limitative example, the distance control element comprises two parallel guides along which the aforementioned longitudinal guide can be shifted, and wherein each end of the longitudinal guide is attached at to one of the parallel guides.

Preferably, the stem is arranged horizontally, the source output is arranged to emit said beam in a downward vertical direction, and said distance control element is configured to vertically position said source output. The arrangement is particularly advantageous in the case where the stem is arranged through a resin tank of the type that has an opening at the top, configured so that the beam can impinge on the tubular shaped surface of the stem through said opening. Furthermore, this configuration allows the partial reuse of Cartesian 3D printing devices in which the electromagnetic radiation source (for example, a laser) is vertically and horizontally shiftable. The above further facilitates the design of the 3D printing device of the invention based on the existing know-how for the current stereolithography devices.

In an alternative embodiment, said stem is arranged vertically, said source output is arranged to emit said beam in a horizontal direction, and said distance control element is configured to horizontally position said source output. As an alternative to the previous embodiment, it also allows reusing known devices for the movement of the electromagnetic radiation source. Regarding these two exemplary embodiments, the choice of one or the other alternative embodiment will depend on the characteristics and, in particular, the dimensions of the stem, the object to be printed and the space required to house the printing device.

Preferably, said 3D printing device further comprises layer measuring means, configured to determine a measure of thickness of a layer of said fluid resin that is provided on said tubular shaped surface. The thickness of the layer of polymerized resin corresponds to the layer of the fluid resin to be polymerized, except for eventual shrinking or expansion during polymerization. Therefore, measuring the thickness of the layer of fluid resin on the tubular shaped surface allows to determine the thickness of the layer of polymerized resin.

Preferably, the layer measuring means comprises a laser profiler, so that the measure of thickness is determined from the difference between a measure of the laser profiler when no fluid resin is provided on the tubular shaped surface and a measure when said fluid resin is provided on said tubular shaped surface. Laser profilers are known in the art and they provide good accuracy. In this case, measuring the thickness of the layer of fluid resin comprises two steps: first, the laser profiler is directed towards the tubular shaped surface without fluid resin on it, so the measured distance is from the profiler to the surface. Second, the fluid resin is provided, and the laser profiler takes another measure; in this case, the measured distance goes from the profiler to the fluid resin. Therefore, using the difference between both measures it is possible to determine the thickness of the layer of resin. The person skilled in the art will understand that the specific calculation will depend on the positioning of the laser profiler and the stem. In the case that the 3D tubular object to be created comprises more than one layer, the equivalent determination of the thickness can be obtained for the second and subsequent layers by comparison, not to the tubular shaped surface itself, but to the layer that has been already polymerized.

Preferably, the 3D printing device further comprises layer thickness control means, configured for receiving the measure of thickness and, when necessary, changing the thickness of the layer of resin provided on the tubular shaped surface. Therefore, it is not only possible to know the thickness of the layer of resin, but also to change it according to the requirements of the 3D tubular object to be printed using the model, in particular, if the measured thickness is different from what is defined in the model, the layer thickness control means increases or decreases the thickness accordingly. The means for changing the thickness depends on the kind of 3D printing device, the fluid resin used, how the resin is provided on the tubular shaped surface, etc. Different options can be envisaged but, preferably, changing the thickness is achieved by means of at least one of:
- changing the amount of resin provided by said resin providing means;
- changing the temperature of said fluid resin; and
- changing the rotation speed of said stem.

As non-limiting examples, in cases where the stem is horizontally arranged inside a tank, changing the amount of resin provided in said tank affects the level of fluid resin inside said tank and, consequently, the thickness of the layer of resin if the tubular shaped surface is under the level of fluid resin. In other cases where the tubular shaped surface is only partially submerged under said level of fluid resin, the resin fluidity can be changed by changing the temperature of the fluid resin, and thus, the thickness of the layer that is dragged to the polymerization point when the stem rotates may also be changed. Similarly, changing the rotation speed also affects how the fluid resin is dragged.

The invention also refers to a 3D printing method, for manufacturing a 3D tubular object according to a printing model, starting from a build platform having an external surface; The method comprises creating one or more successive layers of polymerized resin, in which each layer of polymerized resin is created by the following steps:

providing, on said external surface of said build platform, a fluid resin which is polymerizable by electromagnetic radiation;

according to said printing model, positioning a beam of an electromagnetic radiation suitable for polymerizing said fluid resin towards said external surface of said build platform, thereby creating said layer of polymerized resin;

wherein said build platform comprises a stem having a longitudinal axis, said stem forming a tubular shaped surface around said longitudinal axis, so that said external surface is comprised in said tubular shaped surface, and wherein said beam is variably positioned according to the printing model so that it impinges on different points of the fluid resin on at least one part of the tubular shaped surface of the stem.

The technical elements and effects are equivalent to those of the device described above so, for the sake of brevity, they will not be repeated hereinafter.

Preferably, the step of positioning the beam towards the tubular shaped surface of the stem according to the printing model, comprises positioning said beam by, at least:

a circumferential positioning in a circumferential direction around said longitudinal axis;

a longitudinal positioning along a longitudinal direction defined by said longitudinal axis; and preferably, a distance positioning between said source output and said tubular shaped surface of said stem, thereby defining a beam length.

Preferably, the method comprises the additional steps of creating one or more successive additional layers of polymerized resin, wherein each additional layer is created by the following steps:

providing an additional fluid resin on said tubular shaped surface of said stem, said additional fluid resin being polymerizable by electromagnetic radiation;

according to said printing model, variably positioning a beam of an electromagnetic radiation suitable for polymerizing said additional fluid resin towards said tubular shaped surface of said stem so that it impinges on different points of said fluid resin on at least one part of said tubular shaped surface of said stem having a tubular shape, thereby creating said layer of polymerized resin.

Therefore, the method enables the creation of 3D tubular objects in which each concentric layer can be manufactured from a different polymerized resin, unlike the known methods whereby the use of only one resin is possible and whereby each successive layer is arranged on a successive plane, for example, perpendicular to the longitudinal axis. Preferably, the method comprises repeating the previous steps with the fluid resin, the additional fluid resin, or even other fluid resin or resins. The application of multiple resins that can also be arranged in substantially concentric layers allows for the manufacture of objects aimed to applications that are currently not possible in the field of 3D printing. Therefore, it is expected to be the subject of future research and development efforts.

Preferably, the fluid resin or, where appropriate, the additional fluid resin, are, independently polycaprolactone, PCL, derived compounds, in particular PCL-diacrylate, being a material which is polymerizable by means of ultraviolet radiation, and which viscosity can be controlled by controlling its temperature, which makes it particularly advantageous in the case of the present invention.

Preferably, the fluid resin or, where appropriate, the additional fluid resin, are biocompatible, which allows for their use in medical applications, for example, for the creation of stents. A therapeutic product may optionally be added to at least one of such resins, so that the 3D tubular object itself may have a therapeutic effect.

The invention also refers to a 3D tubular object manufactured by the aforementioned 3D printing method.

The invention also refers to a tubular object manufactured by 3D printing that has at least one layer of resin polymerized by electromagnetic radiation, wherein each of these layers of polymerized resin has a tubular shape around a longitudinal axis, each successive layer being arranged concentrically regarding said longitudinal axis, as opposed to objects that can currently be obtained by stereolithography, in particular for the creation of high-resolution details in which the details are smaller than 200 microns. This type of objects has the additional advantage of an improved structural strength as compared to those made by overlapped flat layers. This type of object is not known in the art and can also be printed using one of the preferred forms of production described above.

Preferably, said layers of polymerized resin are formed by one or more biocompatible resins, preferably at least one of these resins having a therapeutic product, which has the technical effects described above.

The invention also refers to a printing model which defines a 3D tubular object printable according to a method in accordance with any of the preferential embodiments described above, comprising at least the model of a layer to be printed, in which each point of that layer to be printed comprises at least coordinates relative to:

an angle of rotation around said longitudinal axis of that stem;

a longitudinal position, along said longitudinal axis; and preferably, a radial distance from said longitudinal axis.

The invention also refers to the use of the method according to any of the above described preferred embodiments for the manufacture of a stent.

The invention also covers other features of detail illustrated in the detailed description of an embodiment of the invention and in the accompanying figures.

BRIEF DESCRIPTION OF THE FIGURES

Further advantages and features of the invention will become apparent from the following description, in which, without any limiting character, preferred embodiments of the invention are disclosed, in reference to the accompanying figures.

DETAILED DESCRIPTION OF EMBODIMENTS OF THE INVENTION

Some of the embodiments shown in the figures have been made using as a basis a well-known stereolithography 3D printer, in particular the PRUSA MK2S, adapted only for experimental essays in the laboratory that have rendered very positive results. Those skilled in the art will clearly identify the modifications required for the invention. Future versions aimed for the market would use a different structure that the skilled person would have no problems in designing using the teachings of this document.

Figure 1:
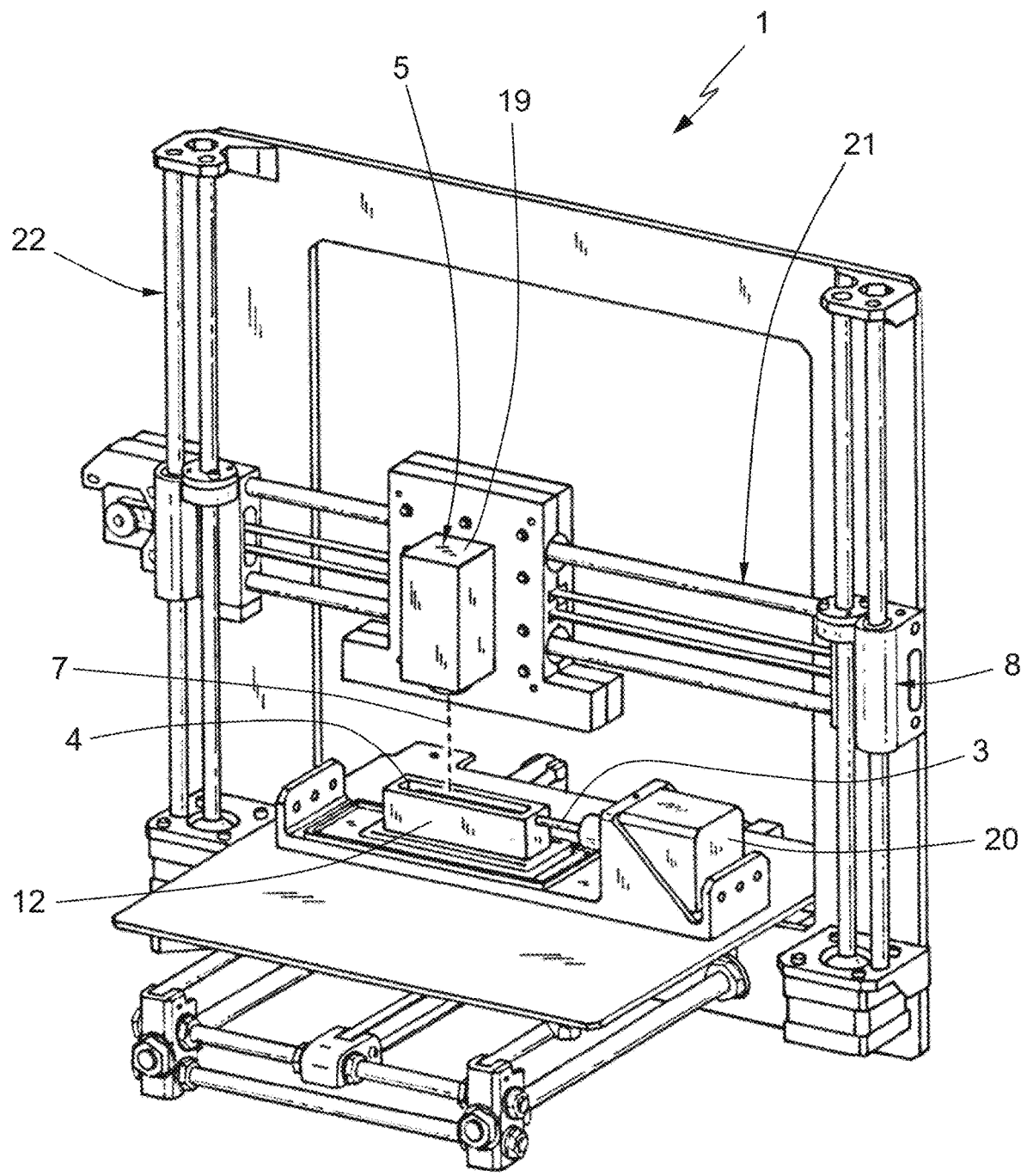
FIG. 1 is a perspective view of an embodiment of a 3D printing device according to the invention.
Figure 2:
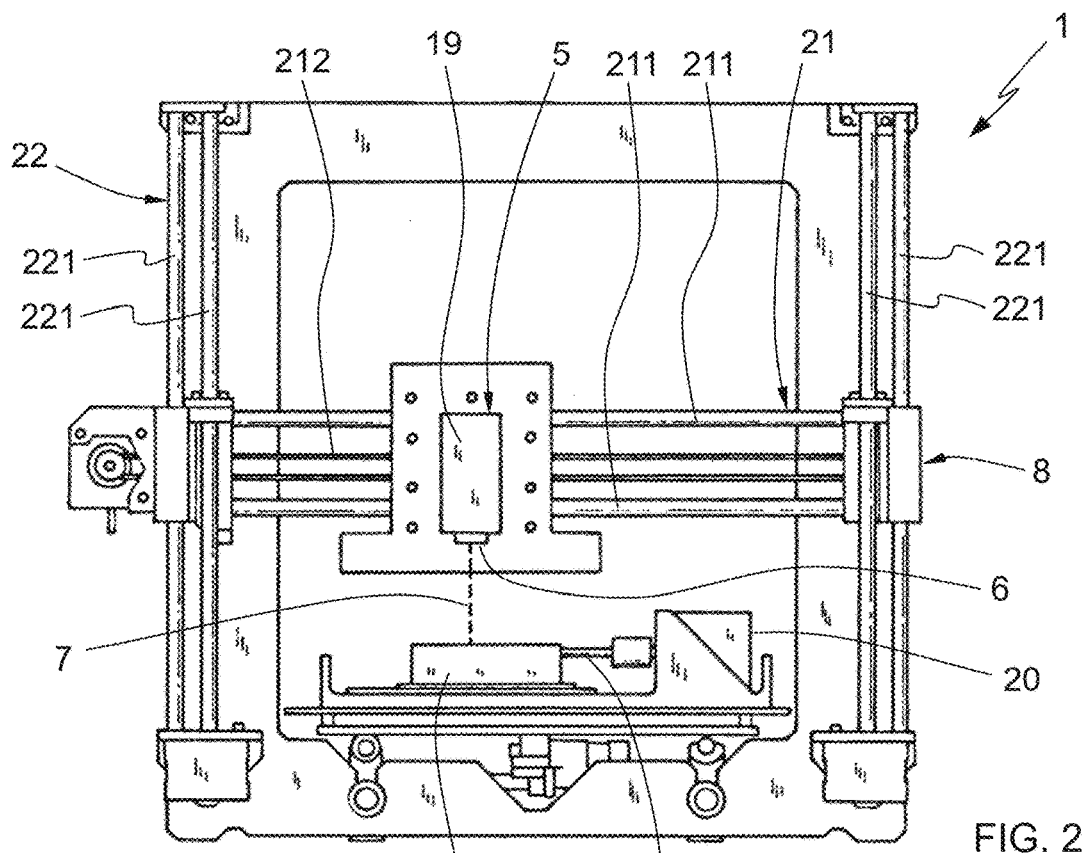
FIG. 2 is a front view of the same embodiment of the 3D printing device shown in FIG. 1.
Figure 3:
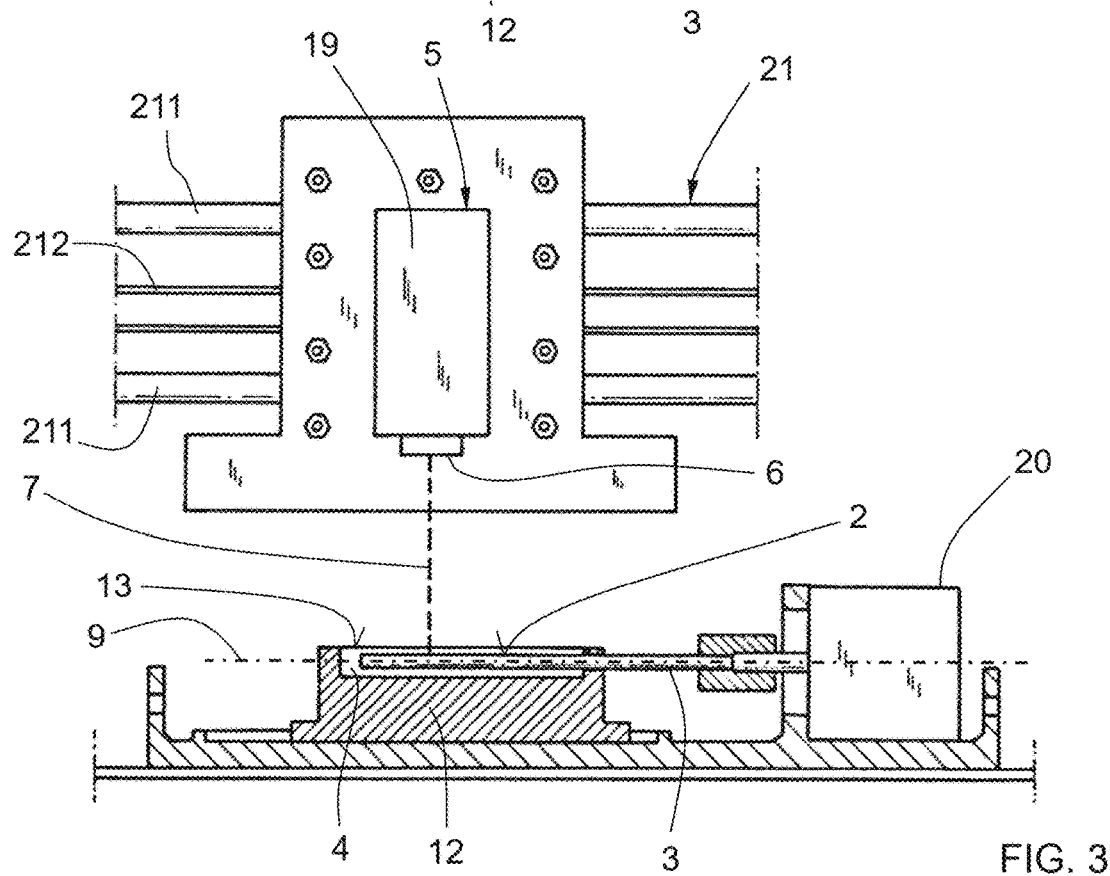
FIG. 3 is a detailed front view of a 3D printing device according to one embodiment of the invention, showing the part corresponding to the electromagnetic radiation source, the beam, the stem, and the resin tank. The resin tank is shown sectioned in order to display the stem. Sections have been marked with parallel diagonal lines in the figures.

FIGS. 1, 2, 3 and 4 show one first exemplary embodiment of a 3D printing device 1 of the invention. Said 3D printing device 1 is aimed for manufacturing at least one 3D tubular object 100 according to a printing model, and it has a build platform having an external surface 2. For this first embodiment, said build platform is a stem 3 having a longitudinal axis 9 as shown in FIG. 3. The stem 3 forms a tubular shaped surface 2 around the longitudinal axis 9. Therefore, the external surface of the build platform is the tubular shaped surface 2 of the stem 3 and has a tubular shape around the longitudinal axis 9. As shown in the figures, the tubular shaped surface 2 of the stem 3 has symmetry of revolution regarding the longitudinal axis 9. In particular, the stem 2 is a cylinder, and the tubular shaped surface 2 has a cylindrical shape.

The 3D printing device 1 also has resin providing means that is configured for providing, on the tubular shaped surface 2 of the stem 3, a fluid resin 4 which is polymerizable by electromagnetic radiation. In particular, said resin providing means has a resin tank 12, arranged in such a way that said stem 3 goes through said resin tank 12. As shown in FIG. 3, the stem 3 is arranged horizontally so that all said tubular shaped surface 2 is located below a resin filling level 13 in said resin tank 12.

The 3D printing device 1 is provided with an electromagnetic radiation source 5 that is configured to emit, from a source output 6 to the tubular shaped surface 2 of the stem, a beam 7 of an electromagnetic radiation suitable for polymerizing the fluid resin 4. For the first embodiment, said electromagnetic radiation source 5 is a laser 19 having a laser output, so that said source output 6 is said laser output. The laser beam 7 has been represented with a dashed line in the figures.

In order to position the beam 7, the 3D printing device is also provided with beam positioning means 8 that is arranged to variably positioning an impinging point of said beam 7 so that the beam 7 impinges on different points of at least one part of the fluid resin 4 provided on said tubular shaped surface 2. Further, the 3D printing device 1 has control means that is used for controlling the beam positioning means 8 and the electromagnetic radiation source 5 according to the printing model, in order to manufacture the 3D tubular object 100. For the sake of clarity, control means is not shown in the figures. FIG. 1 and FIG. 2 show that the beam positioning means 8 is configured to variably position an impinging point of the beam 7 on said fluid resin 4 using three kinds of positioning elements corresponding to three coordinates. Firstly, a circumferential positioning in a circumferential direction around the longitudinal axis 9.

Said circumferential positioning is performed by a rotation control element 20, in particular a servomotor operationally connected to the stem 3 driving the rotation of said stem 3 around the longitudinal axis 9. Secondly, a longitudinal positioning along a longitudinal direction defined by said longitudinal axis 9. The longitudinal positioning is performed by a longitudinal position control element 21 having two parallel straight longitudinal guides 211 configured to longitudinally position the laser 19 that is slidable mounted thereto and, accordingly, position the source output 6. A longitudinal traction belt 212 is used to cause the laser 19 to slide longitudinally along said longitudinal guides 211. The longitudinal guides 211 are parallel to the stem 3 and the longitudinal axis 9, and the source output 6 is arranged for emitting the beam 7 in a downward vertical direction that is perpendicular to the longitudinal axis 9. Thirdly, a distance positioning between the source output 6 and the tubular shaped surface 2 of the stem 3, by means of a distance control element 22, thereby allowing to determine the length of the beam 7. Said distance control element 22 has four straight transversal vertical guides 221 configured to transversally position the source output 6 in a direction orthogonal to the longitudinal axis 9. In the first embodiment, said vertical guides 221 are arranged vertically in order to vertically position the source output 6. In particular, the vertical guides 221 are arranged two by two at both longitudinal ends of the longitudinal guides 211 that are slidably mounted thereto. In this way, the longitudinal guides 211 can slide up and down along the vertical guides 221 and vertically position the source output 6.

The 3D printing device 1 of the first embodiment is further provided with temperature control means. For the sake of clarity, said temperature control means is not shown in the figures, but has a Peltier cell arranged in the tank, so that it is possible to control the temperature of the fluid resin 4.

For the first embodiment, the laser 19 emits a beam 7 of ultraviolet radiation, UV. Therefore, the 3D printing device 1 is able to be used with UV-polymerizable resins. In particular, it is possible to use polycaprolactone-derived resins, for example, PCL-diacrilate. Nevertheless, other types of electromagnetic radiation and fluid resins 4 can also be envisaged within the scope of the invention, for example, in the case that the laser 19 emits a beam 7 of infrared radiation or visible light. Biocompatible resins 4, possibly having a therapeutic additive, can also be used with the 3D printing device of the invention.

Using the 3D printing device 1 of the embodiments described in this document, the 3D printing method for printing a 3D tubular object can comprise several steps for creating successive layers of polymerized resin. Each layer is created by providing a fluid resin 4, so different fluid resins 4 can be envisaged to be used for different layers.

Figures 4A, 4B, 5:
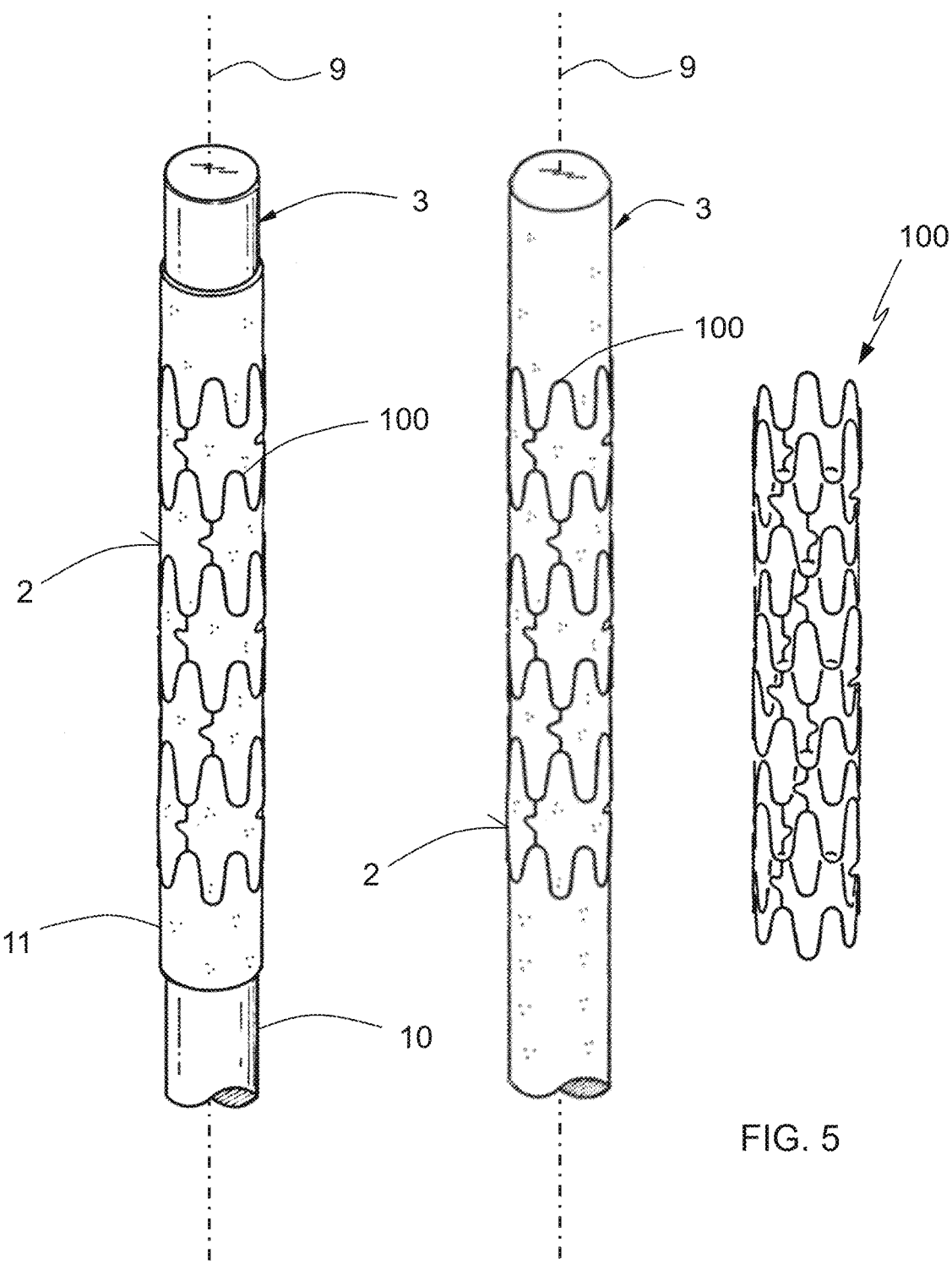
FIG. 4A is a detailed perspective view of a stem of a 3D printing device according to one embodiment of the invention that has been used to manufacture a 3D tubular object, in particular a stent, that is still attached to the stem.
FIG. 4B is the equivalent view of 4A but in a different embodiment wherein the stem is made of a solid block instead of a core and an external layer.
FIG. 5 is a perspective view of the stent of FIG. 8 once it has been removed from the stem of the 3D printing device.

FIG. 4A is a detailed view of the stem 3 of the first embodiment. In this case, the stem 3 has a steel rigid core 10 wrapped in an external layer 11 made of nylon forming the tubular shaped surface 2 of the stem 3. Other metals can be envisaged for the core 10, for example titanium. In addition, other elastomer materials can also be envisaged for the external layer 11, for example, latex. FIG. 4A shows a 3D tubular object that has been manufactured with the 3D printing device 1 following the 3D printing method of the invention, and that is still attached to the tubular shaped surface 2. FIG. 5 shows the same 3D tubular object once removed from the stem 3. In the case of the FIG. 4 and FIG. 5, the invention has been used in order to manufacture a 3D printed stent. FIG. 4B shows a different embodiment of a stem 3 made of a solid block, instead of a core and an external layer, and wherein the tubular shaped surface 2 is not made of a different material than the rest of the stem 3.

As for the first embodiment, the tubular shaped surface 2 of the stem 3 is a diffuse surface that does not reflect the wavelengths of said electromagnetic radiation. The tubular shaped surface 2 of the stem 3 is opaque to the wavelengths.

Other embodiments of the 3D printing device according to the invention are disclosed hereinafter. These embodiments share most of the features disclosed in the first embodiment above. Therefore, only the differentiating features will be described in detail. For the sake of brevity, common features shared with the first embodiment disclosed above will not be described again hereinbelow.

Figure 6:
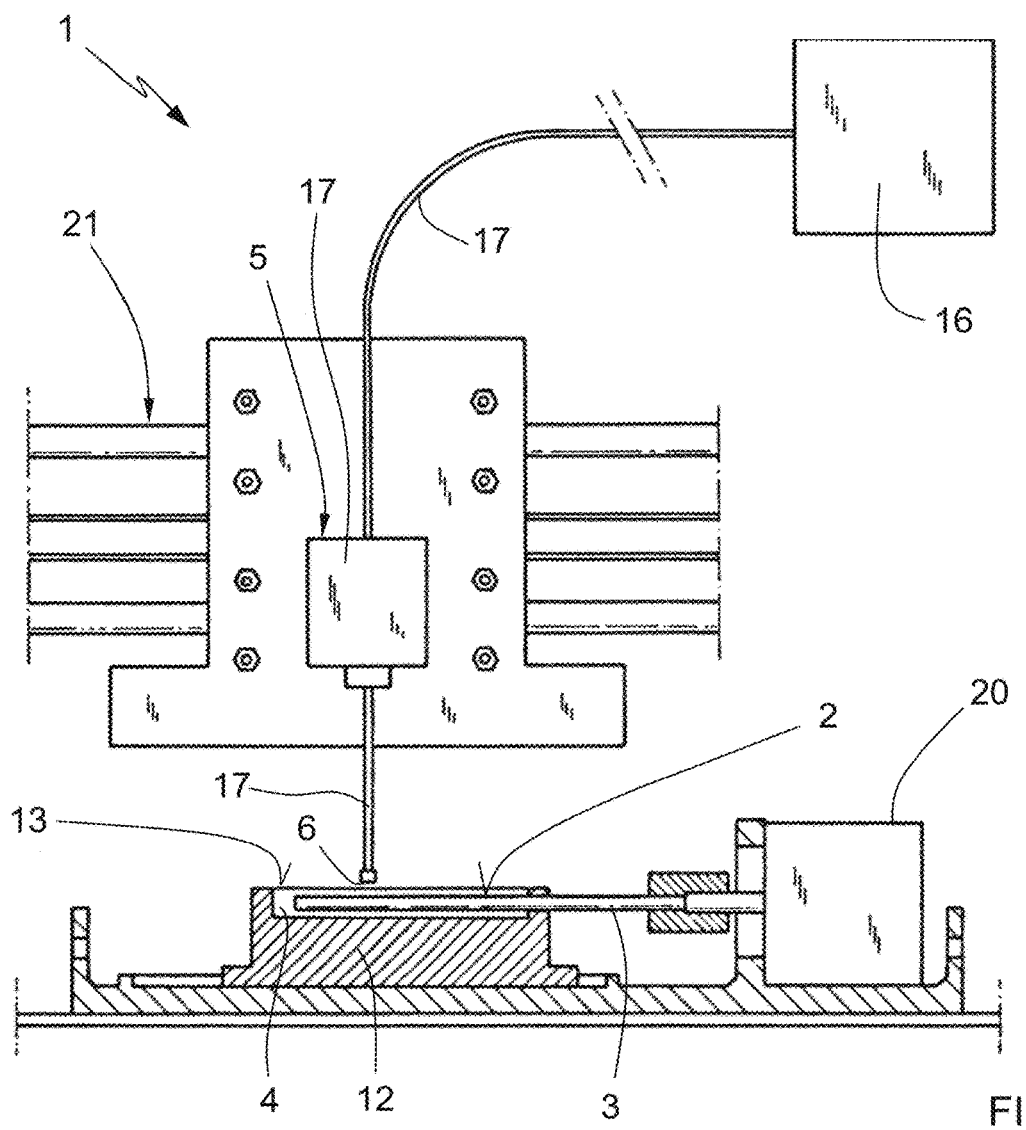
FIG. 6 is a detailed front view of a 3D printing device according to another embodiment of the invention.

FIG. 6 shows a second embodiment of the 3D printing device 1 according to the invention, wherein the electromagnetic radiation source 5 has an electromagnetic radiation generator 16 and an optical fiber guidance module 17 that guides the electromagnetic radiation to an optical fiber output, so that said source output 6 is said optical fiber output.

Figure 7:
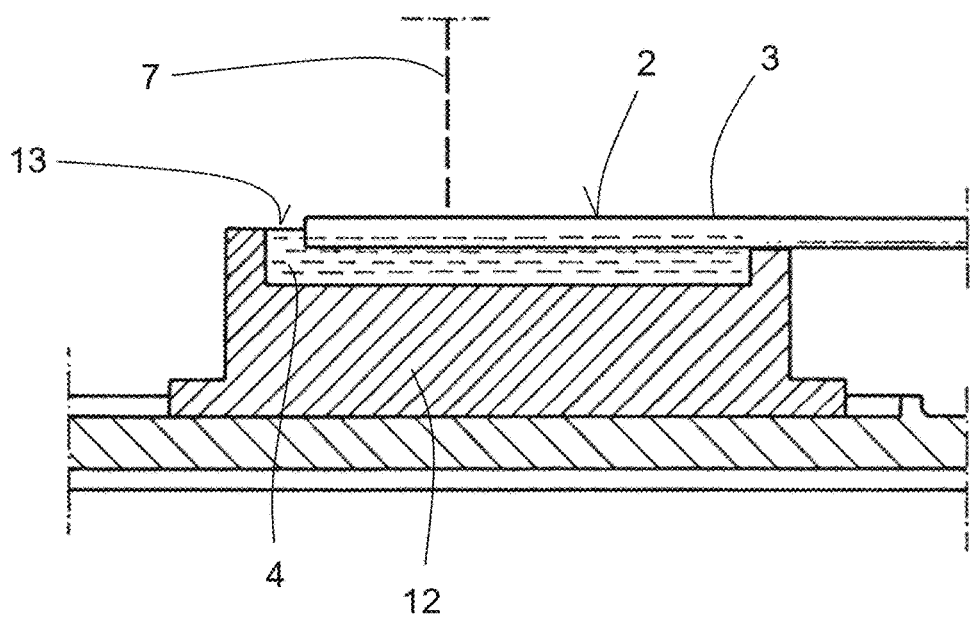
FIG. 7 is a detailed front view of the tank and stem of a 3D printing device according to another embodiment of the invention.

FIG. 7 shows a third embodiment of the 3D printing device 1, wherein the stem 3 is arranged horizontally. In this third embodiment a part of the tubular shaped surface 2 is located above a resin filling level 13 in the resin tank 12 and another part of the tubular shaped surface 2 is located below said resin filling level 13.

Figure 8:
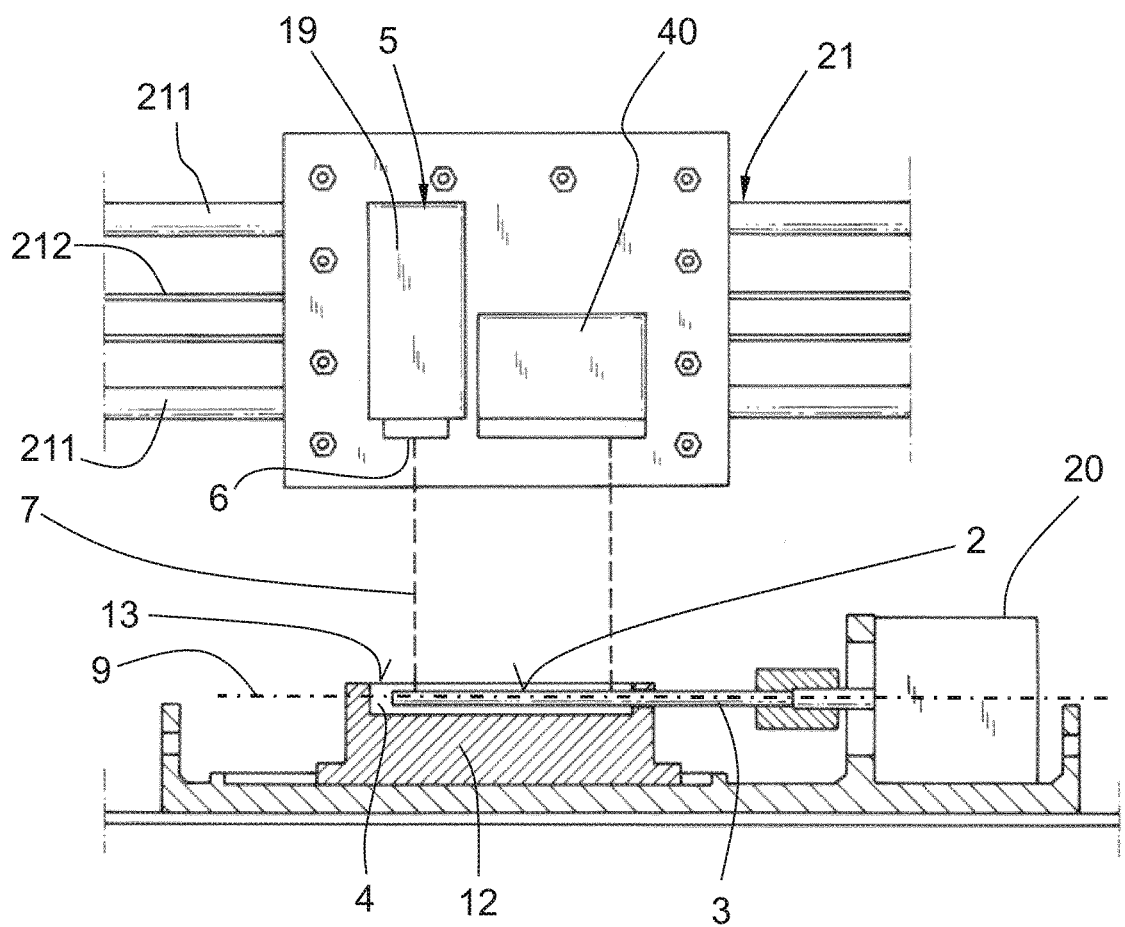
FIG. 8 is a detailed front view of a 3D printing device according to one embodiment of the invention having a laser profiler to measure the thickness of the layer of fluid resin over the tubular shaped surface of the stem.

FIG. 8 shows a fourth embodiment of the 3D printing device 1, wherein the stem 3 is arranged horizontally and the tubular shaped surface 2 is located below a resin filling level 13 in the resin tank 12. In this embodiment, the 3D printing device 1 further comprises layer measuring means 40, configured to determine a measure of thickness of a layer of said fluid resin 4 that is provided on said tubular shaped surface 2. Said layer measuring means 40 comprises a laser profiler, so that said measure of thickness is determined from the difference between a measure of said laser profiler when no fluid resin 4 is provided on said tubular shaped surface 2 and a measure when said fluid resin 4 is provided on said tubular shaped surface 2. In addition, the device further comprises layer thickness control means, which is configured to receive said measure of thickness and, when necessary, changing the thickness of the layer of resin provided on said tubular shaped surface 2, in this case by means of changing the amount of fluid resin 4 provided by said resin providing means, that is, the amount of fluid resin 4 provided in the resin tank 12. Other embodiments can be envisaged, for example, starting from the third embodiment of FIG. 7 and where the layer thickness control means is configured to change the thickness by means of changing the temperature of said fluid resin 4 and/or changing the rotation speed of said stem 3.

Figure 9:
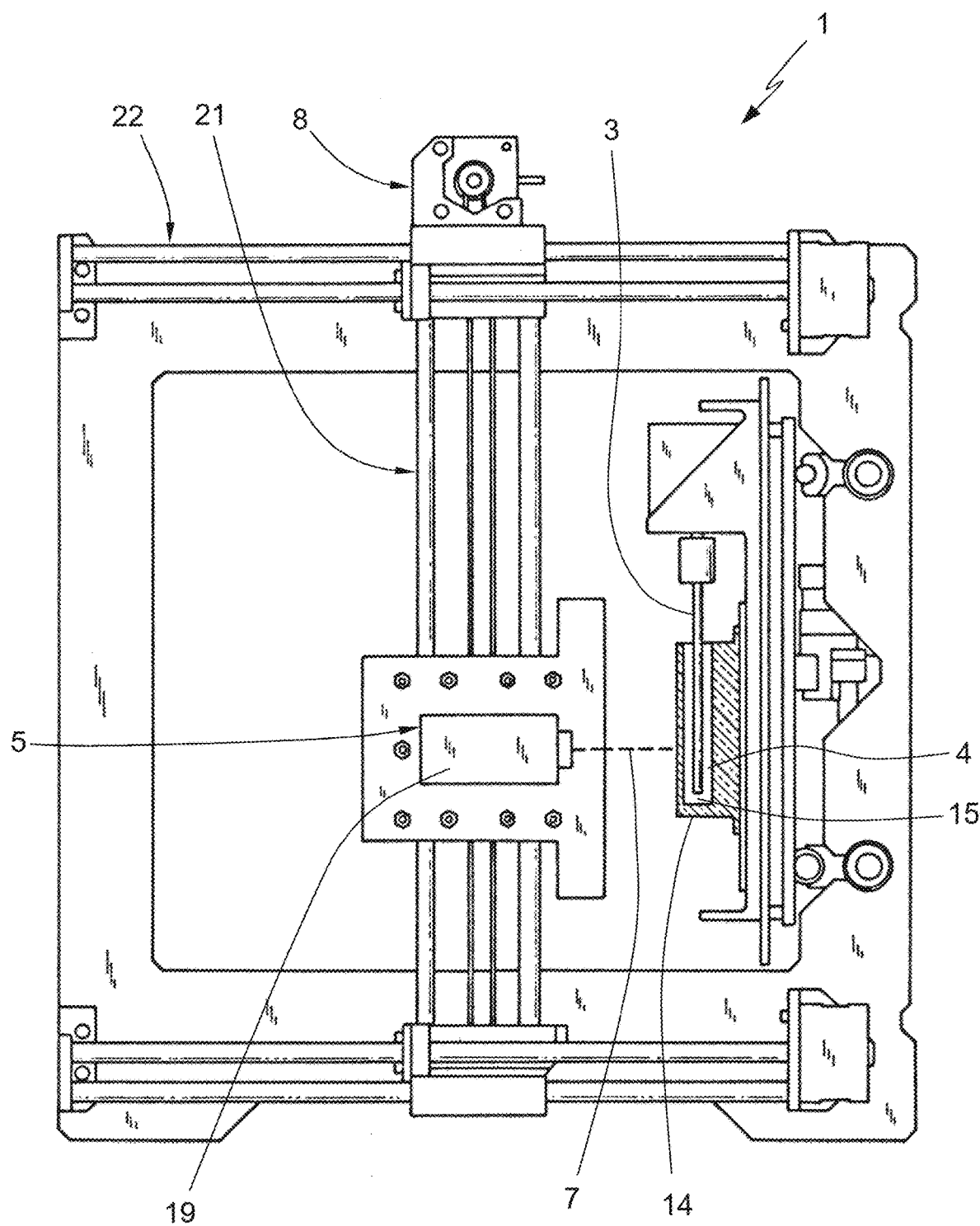
FIG. 9 is a front view of a 3D printing device according to another embodiment of the invention.

FIG. 9 shows a fifth embodiment of the 3D printing device 1, wherein the stem 3 is arranged vertically, the source output 6 is arranged to emit the beam 7 in a horizontal direction, and the distance control element 22 is configured to horizontally position the source output 6. In this fifth embodiment the resin tank 12 has a container 14 arranged around the stem 3, so that a resin chamber 15 is defined between said container 14 and the tubular shaped surface 2 of the stem 3. In this fifth embodiment, the container 14 is made of a material which is transparent to the electromagnetic radiation emitted by the laser 19.

Figure 10:
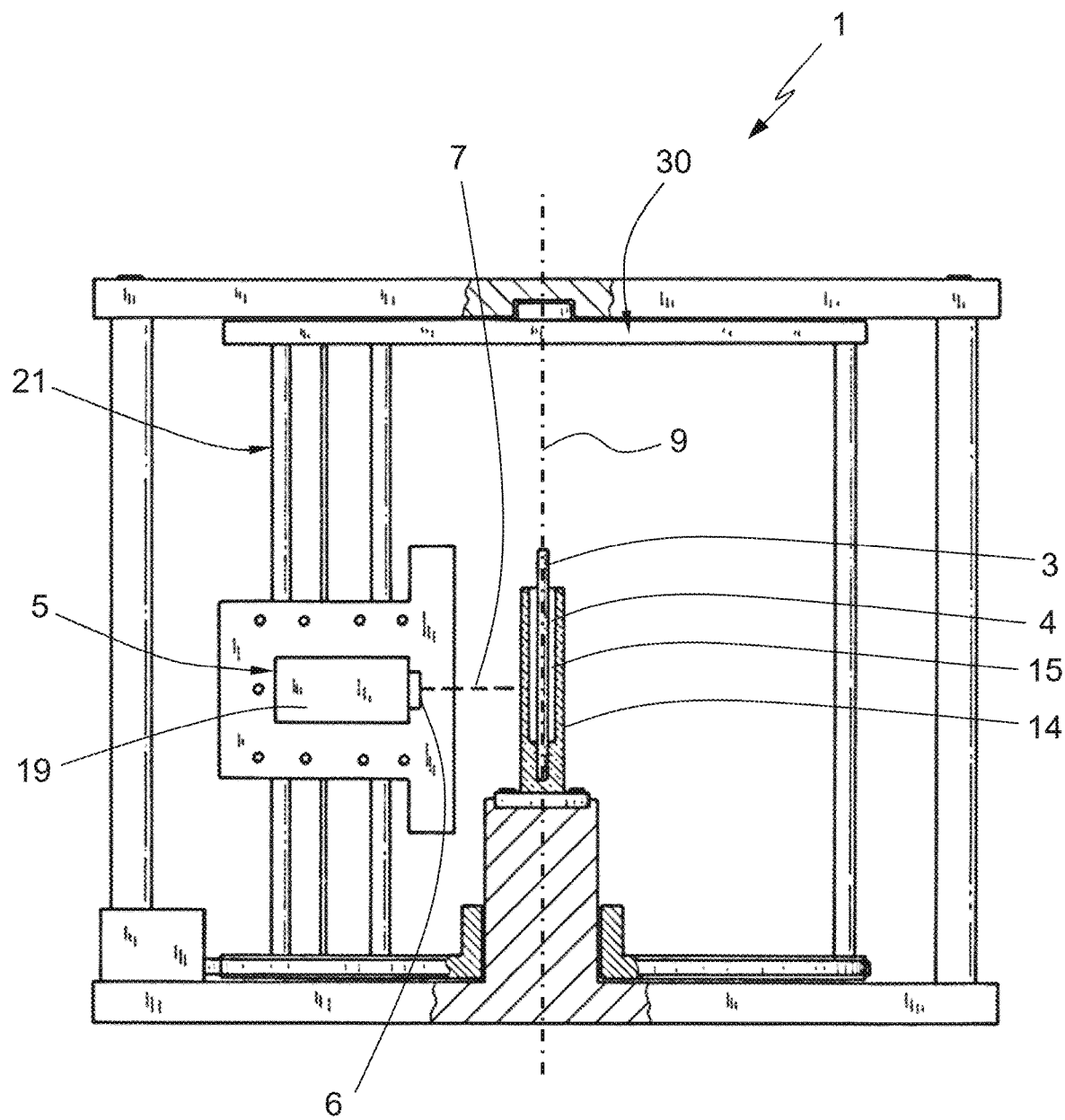
FIG. 10 is a front view of a 3D printing device according to another embodiment of the invention.

FIG. 10 shows a sixth embodiment of the 3D printing device 1, wherein the stem 3 is arranged vertically and wherein the source output 6 is arranged to emit the beam 7 in a horizontal direction. In this sixth embodiment the resin tank 12 has a container 14 arranged around the stem 3, so that a resin chamber 15 is defined between said container 14 and the tubular shaped surface 2 of the stem 3. The container 14 is made of a material which is transparent to the electromagnetic radiation emitted by the laser 19. Contrary to the previous examples, this sixth embodiment is not provided with a distance control element 22. In addition, there is no rotational control element 20 affecting the stem 3 but a source rotation element 30 affecting the laser 19, so that, the source output 6 is moved around the stem 3, in particular, around the longitudinal axis 9. As shown in FIG. 9, the source rotation element 30 comprises a rotatory structure, rotatably mounted around the longitudinal axis 9 that, in this case, is arranged vertically. The longitudinal control element 21 is fixed to said rotatory structure, so that, when the rotatory structure rotates, it causes beam 7 to be positioned in the circular direction.

In other possible embodiments not shown in the figures, the tubular shaped surface 2 of the stem 3 has symmetry of revolution regarding said longitudinal axis 9, so that the tubular shaped surface 2 has a shape that is conical or frustoconical.

The invention claimed is:

1. 3D printing device, for manufacturing at least one 3D tubular object according to a printing model;
said 3D printing device comprising:
  a build platform having an external surface;
  resin providing means, configured to provide, on said external surface of said build platform, a fluid resin which is polymerizable by electromagnetic radiation;
  an electromagnetic radiation source, configured to emit, from a source output to said external surface of said build platform, a beam of an electromagnetic radiation suitable for polymerizing said fluid resin;
  beam positioning means, configured to variably position an impinging point of said beam on said fluid resin provided on said external surface by at least:
    a circumferential positioning in a circumferential direction around said longitudinal axis;
    a longitudinal positioning along a longitudinal direction defined by said longitudinal axis; and
    a distance positioning between said source output and said tubular shaped surface of said stem, thereby defining a beam length; and
  control means, configured to control said beam positioning means and said electromagnetic radiation source according to said printing model to manufacture said 3D tubular object;

wherein said build platform comprises a stem having a longitudinal axis, said stem forming a tubular shaped surface around said longitudinal axis, so that said external surface of said build platform is comprised in said tubular shaped surface, and wherein said beam positioning means is configured to variably position said impinging point of said beam on different points of at least one part of said fluid resin provided on said tubular shaped surface.

2. 3D printing device according to claim 1, wherein said stem comprises a rigid core wrapped in an external layer made of elastomer material, said external layer forming said tubular shaped surface of said stem.

3. 3D printing device according to claim 2, wherein said rigid core is made of steel.

4. 3D printing device according to claim 2, wherein said elastomer material is latex or nylon.

5. 3D printing device according to claim 1, wherein said resin providing means comprises a resin tank, arranged in such a way that said stem goes through said resin tank.

6. 3D printing device according to claim 5, wherein said stem is arranged horizontally so that all said tubular shaped surface is located below a resin filling level in said resin tank.

7. 3D printing device according to claim 4, wherein said stem is arranged horizontally so that a part of said tubular shaped surface is located above a resin filling level in said resin tank and another part of said tubular shaped surface is located below said resin filling level.

8. 3D printing device according to claim 5, wherein said resin tank comprises a container arranged around said stem, so that a resin chamber is defined between said container and said tubular shaped surface of said stem, said container being made of a material which is transparent to said electromagnetic radiation.

9. 3D printing device according to claim 1, wherein said stem is rotatably mounted around said longitudinal axis, and wherein said beam positioning means comprises:

a rotation control element, to control a circumferential positioning of said impinging point of said beam in a circumferential direction around said longitudinal axis by controlling a rotation of said stem around said longitudinal axis;

a longitudinal position control element, to control a longitudinal position of said impinging point of said beam along a longitudinal direction defined by said longitudinal axis; and a distance control element, to control a distance between said source output and said tubular shaped surface of said stem, thereby defining a beam length.

10. 3D printing device according to claim 9, wherein said stem is arranged horizontally, said source output is arranged to emit said beam in a downward vertical direction, and said distance control element is configured to vertically position said source output.

11. 3D printing device according to claim 9, wherein said stem is arranged vertically, said source output is arranged to emit said beam in a horizontal direction, and said distance control element is configured to horizontally position said source output.

12. 3D printing device according to claim 1, wherein it further comprises layer measuring means, configured to determine a measure of thickness of a layer of said fluid resin that is provided on said tubular shaped surface, and layer thickness control means, configured to receive said measure of thickness and, when necessary, change the thickness of the layer of fluid resin provided on said tubular shaped surface.

13. 3D printing device according to claim 12, wherein it comprises, to make said change of the thickness of the layer of fluid resin provided on said tubular shaped surface, means of at least one of:

changing the amount of resin provided by said resin providing means;

changing the temperature of said fluid resin; and changing the rotation speed of said stem.

14. 3D printing device according to claim 12, wherein said layer measuring means comprise a laser profiler, so that said measure of thickness is determined from the difference between a measure of said laser profiler when no fluid resin is provided on said tubular shaped surface and a measure when said fluid resin is provided on said tubular shaped surface.

* * * * *